July 25, 1950      G. S. ALLIN      2,516,743
PIPE COUPLING
Filed March 7, 1947
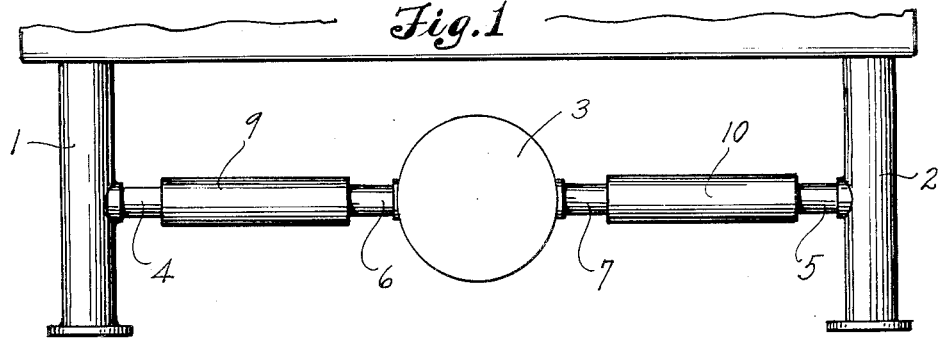
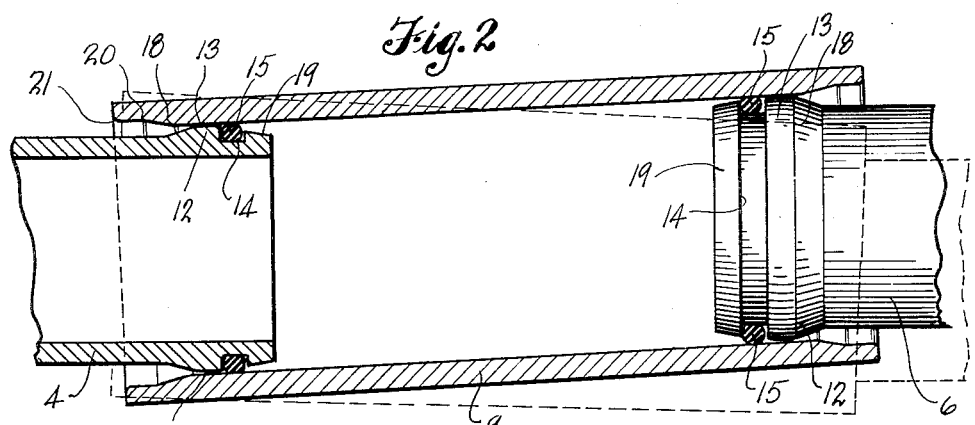
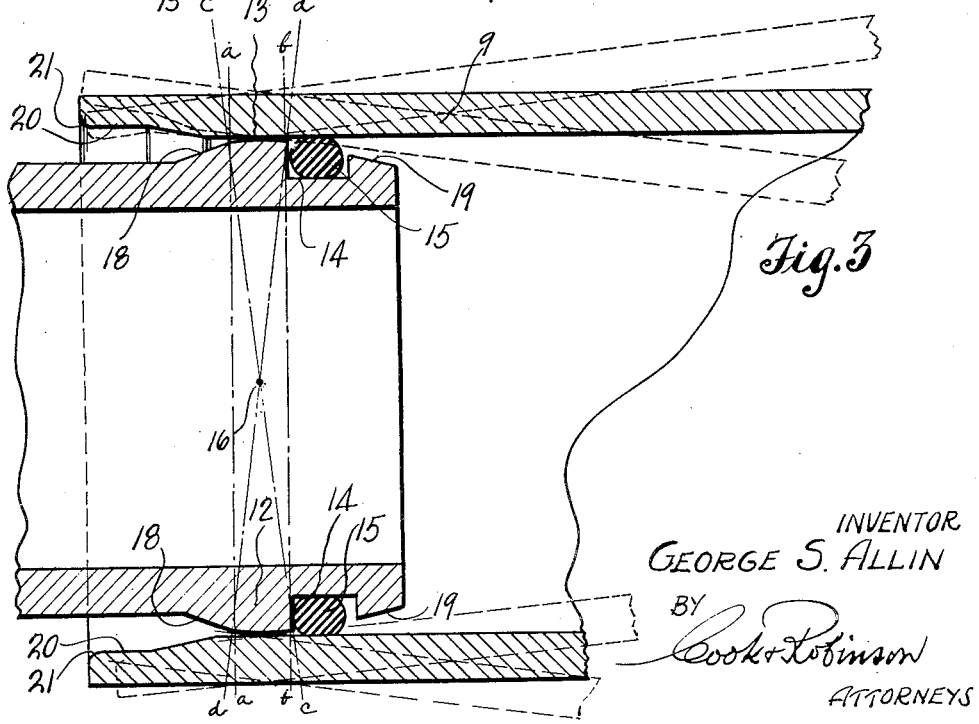
INVENTOR
GEORGE S. ALLIN
BY
Cook & Robinson
ATTORNEYS Patented July 25, 1950

2,516,743

UNITED STATES PATENT OFFICE 2,516,743

PIPE COUPLING

George S. Ailin, Seattle, Wash., assignor to Isaacson Iron Works Inc., Seattle, Wash.

Application March 7, 1947, Serial No. 733,135

2 Claims. (Cl. 285—163)

This invention relates to couplings and it has reference more particularly to pipe couplings designed for connecting spaced and rigidly mounted parts or sections of a pipe line in which a fluid pressure medium is to be confined; it being the principal object of the invention to provide an improved coupling for that purpose that may be adjusted, within predetermined limits, to misalignment of the pipe sections that are to be connected and which, after a connection has been made, will adjust or adapt itself to a certain amount of relative shifting of the connected pipe sections without causing leakage to occur and without any resultant damage to the parts that are comprised within the coupling, especially without causing damage to the sealing gaskets, used in the coupling between telescopically associated parts.

It will here be stated as matter explanatory to the present invention, that a typical application of the present type of connector is found in road building machines, for example, in connection with the hydraulic system used for the raising and lowering of a bulldozer blade as mounted on a tractor. Such a hydraulic system embodies pipe lines for a fluid pressure medium, and a pressure pump that can most advantageously be mounted between two pipe headers or pipe lines. In some of such installations it has been a practise to thread nipples into or to weld them onto the headers in axial alignment and directed toward each other and to then interpose the pump between the ends of the nipples and to make connections therewith by various means, for example, by use of unions, eccentric bushings, pipe fittings, pieces of hose as well as by means of metal sleeves. Where metal sleeves have been used, they are most generally telescopically applied over the adjacent end portions of the nipples that extend from the opposite sides of the pump in alignment with those that are secured to the headers and joints of the connection are then sealed by use of sealing gaskets located between the overlapped or telescoped portions of the nipples and the sleeves.

It frequently happens however, that in such installations, it will be found that the nipples, as applied to the pipe headers, will be out of alignment. In such cases, it is with great difficulty that the connecting sleeves can be properly applied. Furthermore, it has been found that when sleeves of somewhat larger diameter than the nipples are used in order to overcome the difficulty of assembly that arises from this condition of misalignment, the angular relationship of the sleeve and nipple will be such as to pinch the joint sealing gaskets at certain points of the circle and leave them practically free at other points; this condition being detrimental to obtaining an effective sealing of the joints and also is inducive to damage to the gaskets by reason of pinching or shearing action that may result from any subsequent shifting of the parts from any set position of alignment.

In view of the above, it has been the principal object of this invention to provide improvements in such pipe connections that permits of the ready assembly of the telescopically associated parts, even though the parts to be connected may be somewhat out of alignment, and which also will eliminate possibility of damaging the sealing rings or gaskets that might be due to various causes, for instance, to uneven pressure thereon; to inadequate backing; to pinching or to the shearing action that sometimes results from the relative angular movement of the telescopically assembled parts, especially where the gaskets are seated in grooves.

More specifically stated, the objects of the present invention reside in the provision of a pipe connector of a telescopic nature, wherein an inner tubular member, which may be a nipple or part corresponding thereto, is formed about that end portion that is contained within the outer tubular portion or connecting sleeve, with an outstanding, encircling bead having a spherically curved outside surface portion about which the sleeve is applied with close tolerance and which bead also has an outwardly opening groove or channel formed therein on its pressure side, and extending entirely about the nipple and in which a sealing gasket is contained; the sleeve having a certain permissible angular movement relative to the nipple without change in tolerance between the bead and the inner surface of the sleeve.

Still further objects of this invention reside in the details of construction of parts, in their combination, relationship and use as will hereinafter be fully described.

In accomplishing these and other objects of the invention, I have provided the improved details of construction, the preferred forms of which are illustrated in the accompanying drawings, wherein Fig. 1 is an elevation showing a typical application of a pipe connection embodied by the present invention.

Fig. 2 is an enlarged, sectional detail taken substantially in the axial plane of a connector and illustrating the relationship of the sleeve to the joined sections when they are out of alignment.

Fig. 3 is an enlarged, sectional detail of the present joint structure, showing the bead and location of the gasket therein. Also, indicating angular movement of the sleeve relative to the nipple.

Referring more in detail to the drawings:

For purpose of explanation only, and not intended to indicate any limitation in the use of the present coupling or connector, I have shown in Fig. 1, two spaced, rigidly secured pipe headers, 1 and 2, which may be connected in a hydraulic system and between which a pump, designated in its entirety by reference numeral 3, is mounted by connectors embodied by the present invention. In this view, nipples 4 and 5 are fixed rigidly to the headers in approximate axial alignment and directed toward each other. Similar nipples 6 and 7 are rigidly applied in axial alignment to the opposite sides of the housing of pump 3. The pump is interposed between the inner ends of nipples 4 and 5, and the nipples 6 and 7 thereof are joined, respectively, with the nipples 4 and 5, by means of tubular connecting sleeves 9 and 10; each of said sleeves having its opposite end portions telescopically applied over the adjacent end portions of the nipples which it connects, for example, as shown in Fig. 2.

It is to be understood that the connecting sleeves 9 and 10 are in the form of metal tubes, here shown to be of uniform diameter from end to end, and each having an inside diameter that is somewhat greater than the outside diameter of the nipples over which it is applied so that the parts may be readily assembled together even though the joined nipples might be somewhat out of axial alignment and also to permit the parts, after being assembled, to adapt themselves to change in angular alignment of the nipples that might take place after the parts have been assembled due to strain, warping or other causes.

At each point of connection, the inside pipe section, or what I have heretofore referred to as the nipple, is formed about its end portion with an encircling bead 12, having a substantial overall width in the longitudinal direction of the pipe. This bead has a spherically curved outside surface portion 13 centered about a point that is located in the axial line of the nipple. In Fig. 3, this point, which is the center of curvature is designated at 16.

This spherically curved surface portion of the bead is in the nature of a band of substantial width that encircles the nipple and which is bounded by the planes of the lines a—a and b—b in Fig. 3.

The proper functioning of this particular pipe connection depends upon the specific formation of the bead; the place of location therein of the gasket containing groove; the character of the gasket and the maintaining of a close tolerance between the outer spherical surface of the bead and the inner surface of the outer pipe section. Therefore, it is desired here to point out that the bead is so located that its spherically curved surface extends equally to opposite sides of a plane that is passed through the point 16 perpendicular to the nipple axis, and the width of the arc of curvature of this band should be at least twice the angle of deviation which is desired to provide for in the connection between the sleeve and nipple. For example, assuming it is desired to provide for a deviation up to seven degrees as between the inner and outer pipe sections, then the spherical surface 13 of the band should subtend an angle of at least fourteen degrees. This is illustrated in Fig. 3 wherein the dot and dash lines d—d and c—c pass through the point 16, at opposite sides of and each at a seven degree angle to a plane that passes through point 16 perpendicular to the nipple axis. The spherically curved surface portion of the bead subtends the angle between these two diverging lines and the angle measures 14 degrees.

It is also to be explained that the surface portions of the bead, at opposite sides of the spherically curved surface 13 and, as shown in Fig. 3, comprising those surfaces designated at 18 and 19 continuing from the points where the surface 13 intersects with lines c—c and d—d, may be conically sloped, but are within the arc of curvature of the spherical surface, and within the tangential lines passing through the points of intersection of surface 13 with lines c—c and d—d.

Formed in the bead 12, on the pressure retaining side, and outside of the spherically surfaced band, is a continuous, square cut channel or groove 14 of uniform width and depth.

Contained in the channel is a joint sealing gasket 15. The preferred form of sealing gasket comprises a ring of rubber or other suitable material but preferably a gasket of that kind which in trade is known as on "O-ring." This gasket is circular in cross section and is held slightly under compression between the bottom surface of the groove and the inner surface of the sleeve; the width of the groove being such as to permit the gasket to spread laterally, as noted in Fig. 3.

When the nipple and sleeve are in axial alignment the pressure on the gasket will be uniform entirely about the joint but should the connected nipples be shifted out of axial alignment and the sleeve thereby caused to assume an angular relationship to the nipples, as in Fig. 2, the gasket at either end of the sleeve will be compressed to a greater extent along a part of its arc and will be somewhat relieved along the opposite portion of its arc. However, the sleeve maintains a constant, close tolerance to the spherical surface 13 of the bead and no space is opened up into which the pressure of the retained medium might force the gasket and cause it to be pinched in the joint should the parts shift to a different angular relationship. Pressure of the medium carried in the connection keeps the gasket adjacent the high side of the channel.

In Fig. 3 of the drawing I have shown that the inside surface of the end portion of the sleeve is cut away as at 20 and the edge rounded off as at 21. This gives an increased inside diameter to the sleeve at the end that is just slightly greater than the gasket diameter. This is done in order that when the sleeve is slipped over the gasket in telescopically assembling the parts, it will not become caught on or cause damage to the gasket which is applied to the nipple groove 14 prior to the assembling of the parts.

It is customary also after the parts have been assembled to close the ends of the sleeves with a suitable packing material such as candle wicking which may be wrapped about the nipples and pushed into the ends of the sleeves to keep dust and dirt out of the overlapping end. Also clamp collars might then be applied about the nipples to limit the endwise shifting of the sleeves.

The bead enlargement formed about the end of the inside tubular section, the grooving of the bead on the pressure side and the application of the gasket to the groove, together with the spherically curved surface of the bead and the relatively close tolerance of the sleeve about the spherically curved surface of the bead insures the effectiveness of the connection and long life of the gasket. One particular advantage of this type of connection resides in the provision for the assembling of parts even though they be somewhat out of axial alignment, the provision for slight shifting after assembly without detriment to the sealed connection and the insurance against damage to the sealing gaskets. Such connections may be used in various installations other than that herein shown and described and are applicable to pipes of a wide range of diameters. The diametrical enlarging of the end portion of the sleeve is of importance to easy assembly of parts and an insurance against damage to the gasket during assembly.

Having thus described my invention, what I claim as new therein and desire to secure by Letters Patent, is:

1. A pipe coupling for confining a fluid pressure medium therein comprising a cylindrical outer pipe section and a cylindrical inner pipe section; said inner pipe section having an outside diameter that is lesser than the inside diameter of the outer pipe section and formed about its end with a circumferential bead of substantial width and having a spherically curved outer surface portion that is centered at the point of intersection of the axial line of the inner pipe with the medial plane of said bead; the outer pipe section enclosing the beaded end of the inner pipe section therein and having its inner cylindrical surface fitted to the sperical surface of the bead for longitudinal movement and for limited angular movement relative to the inner pipe and said bead being formed with a channel at the pressure side of the said spherical surface portion thereof and encircling the pipe, and a resilient gasket contained in said channel under compression to maintain joint sealing contact with both pipe sections for all relative angular movements thereof permitted by the joint.

2. A pipe coupling as in claim 1 wherein the spherically curved outer surface portion of the bead forms a band that extends equally to opposite sides of the medial plane of the bead, and the surfaces of the bead at opposite sides of said band are conically sloped and entirely within the arc of curvature of the bead.

GEORGE S. ALLIN.

REFERENCES CITED

The following references are of record in the file of this patent:

UNITED STATES PATENTS

| Number | Name | Date |
|---|---|---|
| 386,547 | Martin | July 24, 1888 |
| 483,987 | Balbian | Oct. 11, 1892 |
| 906,849 | Baashuus | Dec. 15, 1908 |
| 1,475,090 | Taylor | Nov. 20, 1923 |
| 2,417,491 | Hill | Mar. 18, 1947 |